US010439976B2

(12) United States Patent
Ravishankar et al.

(10) Patent No.: US 10,439,976 B2
(45) Date of Patent: Oct. 8, 2019

(54) WORKFLOW TO GENERATE METADATA FOR NEW AND UPDATED PRODUCTS AND AUGMENT SHORT MESSAGE SYSTEM CONTENT

(71) Applicant: Dell Products L.P., Round Rock, TX (US)

(72) Inventors: Deepak Ravishankar, Bangalore (IN); Mainak Roy, Kolkata (IN); Rathi B, Bangalore (IN); Sharmad S. Naik, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 376 days.

(21) Appl. No.: 14/922,469

(22) Filed: Oct. 26, 2015

(65) Prior Publication Data
US 2017/0118161 A1 Apr. 27, 2017

(51) Int. Cl.
*H04L 12/58* (2006.01)
(52) U.S. Cl.
CPC ............ *H04L 51/32* (2013.01); *H04L 51/063* (2013.01); *H04L 51/18* (2013.01)
(58) Field of Classification Search
CPC ......... H04L 51/32; H04L 12/588; H04W 4/21
USPC ....................................................... 709/206
See application file for complete search history.

(56) References Cited

U.S. PATENT DOCUMENTS

| | | | |
|---|---|---|---|
| 9,471,939 B1* | 10/2016 | Balasubramanian .. | G06Q 50/01 |
| 2011/0137736 A1* | 6/2011 | Soza ...................... | G06Q 30/02 |
| | | | 705/14.73 |
| 2012/0192227 A1* | 7/2012 | Fleischman ........ | H04N 21/2407 |
| | | | 725/34 |
| 2014/0278800 A1* | 9/2014 | Nguyen ............. | G06Q 30/0205 |
| | | | 705/7.34 |
| 2014/0279038 A1* | 9/2014 | Lombard ........... | G06Q 30/0269 |
| | | | 705/14.66 |
| 2015/0067048 A1* | 3/2015 | Kannan .................. | H04L 65/40 |
| | | | 709/204 |
| 2015/0348097 A1* | 12/2015 | Andrianakou .... | G06F 17/30312 |
| | | | 705/14.49 |
| 2016/0088030 A1* | 3/2016 | Banatwala ........ | G06F 17/30867 |
| | | | 715/753 |
| 2016/0269344 A1* | 9/2016 | Anders ................... | H04L 51/32 |
| 2016/0343040 A1* | 11/2016 | Garrity ............. | G06Q 30/0276 |

* cited by examiner

*Primary Examiner* — Tonia L Dollinger
*Assistant Examiner* — Adam A Cooney
(74) *Attorney, Agent, or Firm* — Terrile, Cannatti & Chambers; Stephen A. Terrile (57) ABSTRACT

A system, method, and computer-readable medium are disclosed for providing a short message metadata generation tool which performs a short message metadata generation operation which automatically generates metadata for new and/or updated products as well as augmenting short message content. The short message metadata generation operation provides users with customized metadata for various products and/or lines of business and guide official company identifiers with reliable data that can be promoted among customers with ease.

15 Claims, 9 Drawing Sheets

WORKFLOW TO GENERATE METADATA FOR NEW AND UPDATED PRODUCTS AND AUGMENT SHORT MESSAGE SYSTEM CONTENT

BACKGROUND OF THE INVENTION

Field of the Invention

The present invention relates to information handling systems. More specifically, embodiments of the invention relate to a workflow to generate metadata for new and updated products and to augment short message system content.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The widespread availability of such information handling systems has been instrumental in the adoption of social media into the mainstream of everyday life. Social media commonly refers to the use of web-based technologies for the creation and exchange of user-generated content for social interaction. Twitter is an example of such a social media platform where users from across the world come together to engage in live, public or professional conversations. With a social media platform, short message identification is often accomplished via a short message tag identifier. In certain social media platforms, this short message tag identification is accomplished using metadata such as tag data (e.g., identified as #tag (pronounced "hashtag")). Organizations can participate in these conversations by connecting with users that have diverse backgrounds and interests. Social media platforms provide an effective means of sharing thoughts and views.

SUMMARY OF THE INVENTION

A system, method, and computer-readable medium are disclosed for providing a short message metadata generation tool which performs a short message metadata generation operation which automatically generates metadata for new and/or updated products as well as augmenting augment short message content. The short message metadata generation operation provides users with customized metadata for various products and/or lines of business and guide official company identifiers with reliable data that can be promoted among customers with ease.

In various embodiments, the short message metadata generation operation includes one or more of the following operations: generating new tag data based upon keywords associated with the new and/or updated products, captures trending tag data associated with the products, identifies influencers associated with the products and engages the influences via company generated short messages, downloads and checks company information for information regarding a new release of an existing products, downloads and checks company information for information regarding newly released products, updates company organization (e.g., line of business) specific repositories with new tag data, broadcasts product information using company specific identifiers (e.g., handles), generates reports regarding recent and effective short message metadata. Such a short message metadata generation operation reduces overhead associated with short message generation by automatically generating metadata, maintains a resemblance across a company among tag data used by different company specific identifiers, maintains a resemblance across a company among tag data used for company specific content by a plurality of users (e.g., company employees and company customers), amplifies content via different company channels by broadcasting the short message across a plurality of social media platforms, contributes towards a brand factor of the company by disseminating information to a global audience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Aspects of the present disclosure include a recognition that it is often desirable for organizations to identify and build new short messages for the latest features for multiple products, and keep synergy between these new short messages. The new short messages would have the latest KeyWords as in new #tags. Also, the new short messages should cover the existing (already acknowledged) #tags within it.

While constructing a new short message, it is very important to know which customer identifier to use to broadcast these short messages, which keywords and #tags to be added and, which influencers to add for this content to get maximum visibility.

Additionally, aspects of the present disclosure include a recognition that it can be difficult to create a map between the products, KeyWords, #tags, influencers, and the correct customer identifier to promote the latest information. Such a map often requires a manual effort to create effective short messages for the new release of an existing product and the newly released products. With the manual efforts it is often difficult to identify trends as the trends may vary within a short time.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
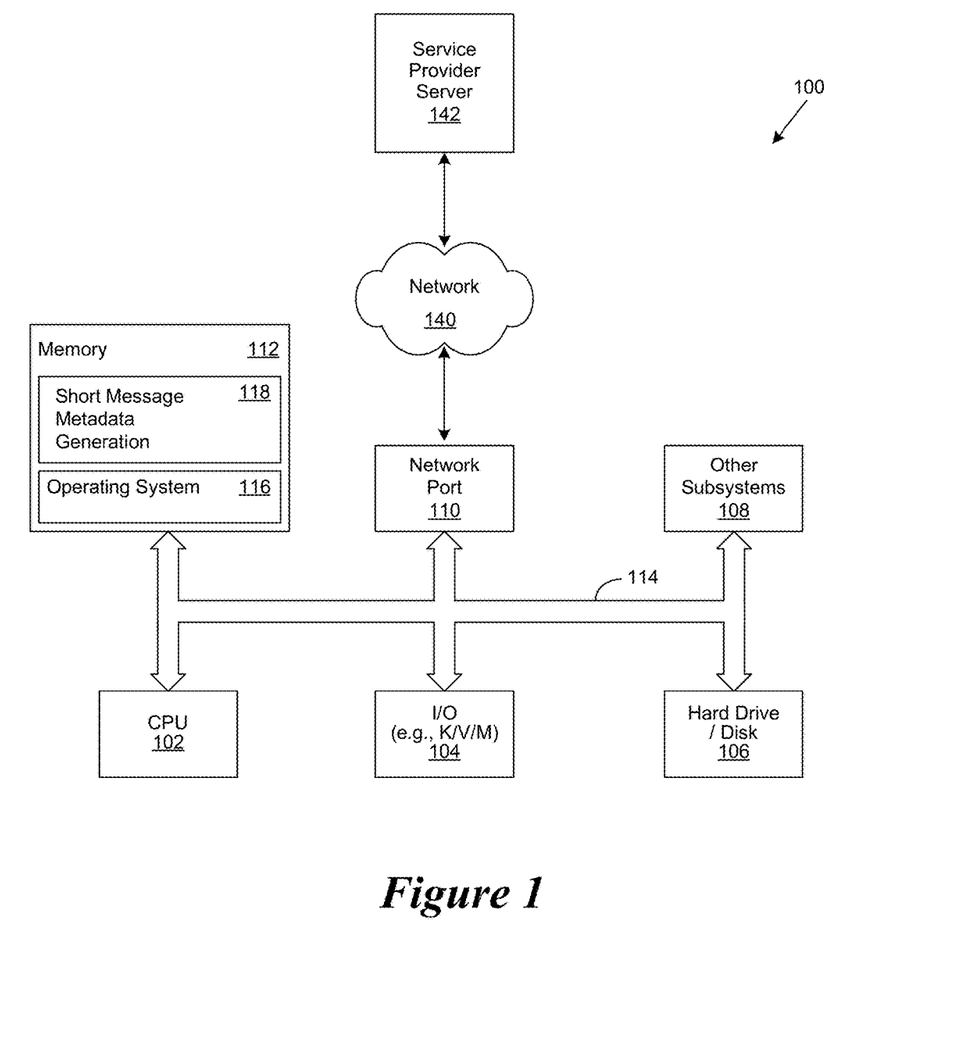
FIG. 1 shows a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a short message metadata generation module 118.

The short message metadata generation module 118 performs a short message metadata generation operation which automatically generates metadata for new and/or updated products as well as augmenting augment short message content. The short message metadata generation operation provides users with customized metadata for various products and/or lines of business and guide official company identifiers with reliable data that can be promoted among customers with ease.

In various embodiments, the short message metadata generation operation includes one or more of the following operations: generating new tag data based upon keywords associated with the new and/or updated products, captures trending tag data associated with the products, identifies influencers associated with the products and engages the influences via company generated short messages, downloads and checks company information for information regarding a new release of an existing products, downloads and checks company information for information regarding newly released products, updates company organization (e.g., line of business) specific repositories with new tag data, broadcasts product information using company specific identifiers (e.g., handles), generates reports regarding recent and effective short message metadata.

Figure 2:
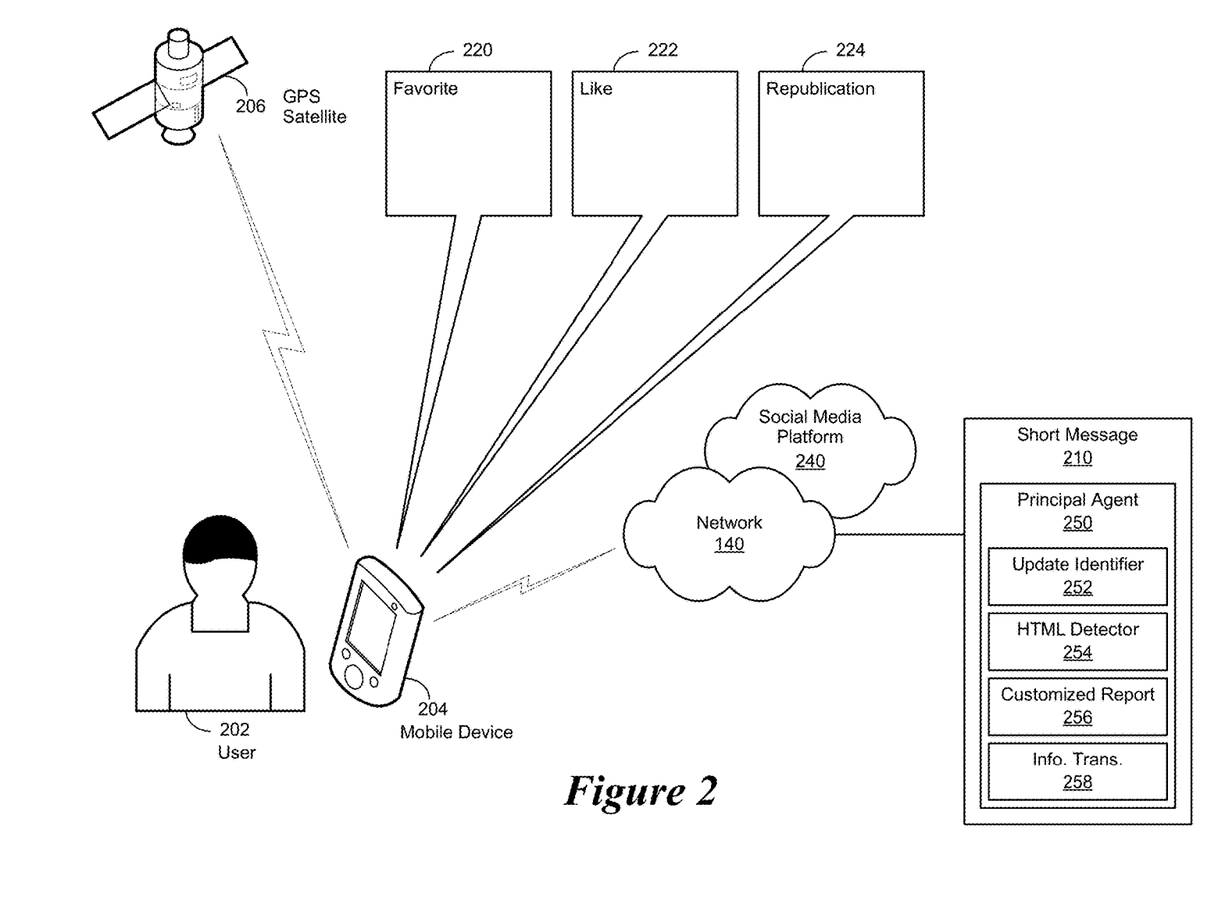
FIG. 2 shows a block diagram of a short message metadata generation system operational flow.

FIG. 2 shows a simplified block diagram of the delivery of a short message implemented in accordance with an embodiment of the invention. As used herein, a short message broadly refers to a short message associated with a social media platform. In this and other embodiments, these short messages may be delivered to a mobile device 204 being used by a user 202.

As used herein, a mobile device 204 refers to wireless devices such as mobile telephones, smart phones, personal digital assistants (PDAs), tablet computers, handheld or laptop computers, and similar devices that have telecommunications capabilities. In various embodiments, the mobile device 204 is used to exchange information between a user 202 and a short message tool 210, described in greater detail herein through the use of a network 140. In certain embodiments, the network 140 is likewise used by the mobile device 204 to exchange information between the user 202 and one or more social media platforms 240.

In various embodiments, the network 140 may be a public network, such as the Internet, a physical private network, a virtual private network (VPN), a wireless network, or any combination thereof. In certain embodiments, the wireless network may be a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA).

Other embodiments may include the implementation of other 3G technologies, including evolution-data optimized (EVDO), IEEE 802.16 (WiMAX), wireless broadband (Wi-Bro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

In various embodiments, the short message may be delivered in the form of a Short Message Service (SMS) message, a Multimedia Messaging Service (MMS) message, or a Tweet® message, provided by Twitter, Inc. of San Francisco, Calif. Skilled practitioners of the art will be familiar with SMS messages, which are a text messaging service component of telephone, Web, or mobile communication systems. SMS messages are limited to a total of 160 seven-bit characters and use a stateless communications protocol, meaning every SMS message is considered independent of other messages. In certain embodiments, SMS messages may be concatenated to provide larger amounts of content within the cognitive short message. While SMS is typically implemented for person-to-person (P2P) messaging, it may also be implemented in certain embodiments for application-to-person (A2P) messaging. As an example, the short message tool 210 may be implemented to deliver a short message to a user's 202 mobile device 204.

Those of skill in the art will likewise be familiar with MMS messages, which provide a way to send messages that include multimedia content to and from mobile devices 204. Currently, the most popular use of MMS is to send photographs from camera-equipped mobile devices 204. However, MMS may implemented in various embodiments to deliver news and entertainment content as part of a cognitive short message. In certain embodiments, MMS may likewise be implemented to deliver scannable coupon codes, product images, audio, videos and other information as part of a cognitive short message.

Twitter, Inc. will likewise be familiar to skilled practitioners of the art as a social media service that allow users to send and receive short, 140 character messages, known as Tweets®. Currently, registered users of Twitter can read and post Tweets®, but unregistered users are only allowed to receive them. In various embodiments, Twitter can be accessed through a website interface, SMS, or an application implemented on a mobile device 204. In these and other embodiments, Twitter users may subscribe to Tweets® from other users, which is known as "following." In certain embodiments, Tweets® may be implemented to accommodate multimedia content. In these embodiments, the multimedia content may be provided as part of a cognitive short message delivered as a Tweet®.

Short message operations are initiated by first selecting a target user 202 and then performing ongoing monitoring operations to monitor their social media interactions, their physical location, and the current date and time. If a social media interaction 220 by the target user 202 is detected, then data associated with the social media interaction is captured. For example, the social media interaction data may include a user post 220 to a social media platform 240 (e.g., a tweet). The user post may take the form of a favorite indication within a short message 220, a like indication within a short message 222 or a republication (also referred to as a forwarding) short message 224 (e.g., a re-tweet). Additionally, in certain embodiments, the location of the user 202 may be determined through the use of Geographical Positioning System (GPS) satellite 206 data acquired by the user's mobile device 204. Some or all of the information gathered when performing short message operations may be used when performing a short message tag identification operation. For example, in certain embodiments, trending information may be derived from information obtained from the short message operations.

When performing a short message tag identification operation, the short message tag identification system 250 collates trending tag identifiers which are in some way related to a company's business. These trending tag identifiers are stored within a short message tag identification information repository and are used by the short message tag identification system to automatically generate tag identifiers which are related to the company's business. Such a short message metadata generation system 210 allows a user associated with the company to identifier tag identifiers which will likely provide increased visibility to content associated with the short message so as to increase the visibility of any information, such as product information, that the company desires to promulgate.

In various embodiments, the short message tag metadata generation system 210 includes some or all of the functionality of the short message metadata generation module 118. In certain embodiments, the short message metadata generation system 210 includes a principal agent 250. The principal agent 250 further includes one or more of an update identifier module 252, an HTML detector module 254, a customized report module 256 and an information transmitter module 258.

The short message metadata generation system 210 amplifies short message information by using a plurality of short message identifiers after analyzing short message metadata. The plurality of short message identifiers can include both office message identifiers (i.e., short message identifiers associated with a company for which the short message tag identification system 210 is executing) as well as individual short message identifiers (i.e., short message identifiers associated with individuals). Once the short message metadata generation system 210 collects information from a particular social media platform 240, the short message metadata generation system 210 stores this information within a particular location along with suggestive tag data, an associated influencers list, as well as identified associated html metadata. The information can then be broadcast via a social media platform along with any recent and/or trending tag data so that the content is amplified to receive more customer visibility. Different organizations within a company (e.g., different LOBs or individuals) may have different preferences regarding which information is collected as well as what types of information are associated with the collected information.

In various embodiments, the principal agent 250 is associated with and executes on a server type information handling system such as information handling system 100. The server type information handling system may be internal to a particular company or may be associated in some way with a particular company such as by executing on a virtual machine which is remotely located but is controlled by the company. The principal agent 250 communicates with and receives information from a social media platform such as the Twitter social media platform. In certain embodiments, the principal agent accesses the social media platform via a predefined set of application program interfaces (APIs) such as the streaming APIs available from certain social media platforms.

With certain social media platforms, the streaming APIs provide access to some or all of short message public streams, short message user streams and short message site streams. While these streams are intended for servers which connect to the social media platform on behalf of many users, the principal agent 250 stands in for a user in the present invention and becomes the user of the data. The principal agent 250 also has the control to monitor both inbound and outbound data streams and to fetch different metadata from the inbound and outbound data streams.

When the principal agent 250 collects the information from the various streams, the information from the various streams is stored within a database which contains metadata for products that are associated with the company, e.g., products within a particular product portfolio. In certain embodiments, this database may comprise a staging server and correspond to a line of business specific database. The combination of the database and a server type information handling system functions as the staging server. The staging server holds the generic data which are originate from Twitter or any other social media platforms. Whereas the line of business specific database is controlled by the company to modify, enter, add and define data for a product as well as a line of business.

In certain embodiments, the principal agent can interact with different line of business explicit filters to categorize the retrieved data. The principal agent 250 stores the metadata within the line of business specific database and maintains the granularity for each product under a line of business. In various embodiments, this is a regular process where the principal agent 250 generates the data periodically such that wherever there are newer influencers, and/or newer tag data, the database is updated accordingly. Thus ensuring that users are always guided by the most recent metadata.

The metadata generation workflow enables users to apply the appropriate metadata and related information while posting a short message. The appropriate metadata may be defined as medadata which is specific to a particular short message. The metadata generation workflow also enables users to easily join ongoing trends which are associated with a product or company of interest. Additionally, in certain embodiments the principal agent 250 processes the content to enable generation of customized reports.

More specifically, the update identifier module 252 executes regularly (e.g., periodically) at predefined times. The update identifier module 252 downloads a product catalog e.g., from a company support site server. In various embodiments, the scheduling of the predefined times can be customized based on the user's requirements. The update identifier then compares a most recent catalog (e.g., Catalog n) with a next most recent catalog (e.g., Catalog n−1) to identify the new products (i.e., products which are going through an initial or first release) along with the updated product lists (products which are going through subsequent releases). The update identifier module 252 also assists the principal agent storing the captured data to LOB specific folders with the captured data. In certain embodiments, the update identifier 252 uses predefined keywords and company internal metadata to station any newly release product under a specific LOB. Additionally, in certain embodiments, the update identifier module 252 generates a list of the products which have an associated new release and generates a stack containing the new release information for further processing. The update identifier module 252 then provides this stack to the HTML detector module 254.

The HTML detector module 254 is the portion of the principal agent 250 which includes the intelligence to interact with a product landing page of the company. For example, in certain embodiments, this will be the main page at which a customer arrives when accessing a company website. This main page is often the page at which a customer can obtain high level information regarding products of a company. This main page is also often the page via which a customer can navigate to a particular line of business of a company. The HTML detector module 254 uses predefined keywords (which may be obtained from a list maintained by the principal agent 250 for each product for each LOB of a company) to identify any significant HTML files for particular products. Significant HTML files may be defined as one or a plurality of HTML files from a landing page identified based upon predefined keywords which include content relating to the predefined keywords.

Based on the keywords matched status, the HTML detector module 254 prioritizes the list of HTML files. The more keywords contained within the HTML files, the more reasons to promote that information across multiple platforms to cover a broader spectrum of customers of the company. After the HTML detector module 254 prioritizes the list for one product, the HTM detector module 254 provides the stack to the customized report module 256. The HTML detector module performs the operation one product at a time to generate the query. This sequential method enables the HTML detector module 254 to overcome a situation where various products include overlapping keywords. In certain embodiments, it is often possible that that differing products have overlapping keywords. Thus, to avoid any ambiguity, queries are designed sequentially.

The customized report module 256 provides a user with best fit short message metadata. In certain embodiments, the customized report module 256 provides collaborated information for any users (be they individuals and company official channels) of the agent. Collaborated information is information which is filtered and/or customized based upon criteria relating to the users.

More specifically, in certain embodiments, the collaborated information comprises details of lines of business and/or of individual products. Providing these details enables users to select a desired product or LOB that they wish to post information about over via a social media platform. In certain embodiments, the by providing a filtering function, the customized report module 256 allows a user to only access data about which they are interested. The customized report module 256 provides the flexibility to the users to define the filters based on their individual requirements.

Additionally, in certain embodiments, the collaborated information comprises keywords. When a user defines a particular line of business of interest, the user is guided via a list of prioritized keywords for that particular LOB. Using keywords in this manner allows the user to use the same set of metadata while spreading the information across different platforms. Thus providing keywords within the collaborated information ensures that the same set of keywords is used by multiple user identifiers for the same products. Providing keywords within the collaborated information also contributes towards the searchability of that particular product and contributes towards increasing a short message trends with respect to the particular product.

Additionally, in certain embodiments, the collaborated information comprises new tag data (e.g., new #tags). With new products, it is important to generate relevant and unique tag data. The customized report module 256 automatically identifies keywords for a new product and generates new tag data for the new product. In certain embodiments, the new tag data is generated by converting the keywords to the tag data for further usage. The customized report module 256 also broadcasts the new tag data through multiple channels to enable the tag data (as well as the new product associated with the tag data) to gain momentum (e.g., to begin trending).

Additionally, in certain embodiments, the collaborated information comprises an identified unique set of prioritized html files. This collaborated information can be helpful because there may be overlapped keywords and generic keywords for a LOB present in different HTML files. The HTML detector 254 removes these ambiguities and searches for the unique product specific keywords before comparing with secondary keywords. The number of occurrences of these keywords will prioritize the ranking of the identified HTML files.

Additionally, in certain embodiments, the collaborated information comprises a list of short message identifiers to be used (e.g., desirable twitter handles to be used) when posting a small message about the product of interest. In various embodiments, the customized report module includes information about a list of short message identifiers (e.g., twitter handles) which are associated with individual products and LOBs. In various embodiments a particular short message identifier may be associated with multiple products.

Additionally, in certain embodiments, the collaborated information comprises a list of influencers. In certain embodiments, the list of influencers may be based on certain lines of business. In various embodiments, the customized report module 256 includes a list of influencers for a specific business which individuals can follow and address while spreading the latest information about a product. In various embodiments, the customized report module 256 includes a list of customers for a specific business which individuals can follow and address while spreading the latest information.

The information transmitter module 258 provides an interactive portion of the agent, which functions with a browser such as a web browser when initiating a short message post. In various embodiments, the information transmitter module 258 fetches customized reports periodically and pushes the file towards any mapped devices. In certain embodiments, the mapped devices comprise client systems (e.g., a mobile device 204) which are going to post a short message. Whenever the information transmitter module 258 detects any instance of a short message, the information transmitter module 258 starts matching the words against the keywords and the tag data which are already there in the database. When the information transmitter module 258 matches the keywords or tag data and defines a product or line of business, the information transmitter module 258 automatically presents a user (e.g., user 202) with any other metadata (e.g., trending #tags, list of influencers, exact .html links) associated with the keyword. Because the database is always up-to-date, the information transmitter module 258 provides best possible metadata for the content. In various embodiments, the user can elect to accept the suggested metadata for their content prior to posting the short message.

By providing a user with this metadata information, the user can easily generate short message posts which make use of the data and promote the information via multiple social media platforms.

Figure 3:
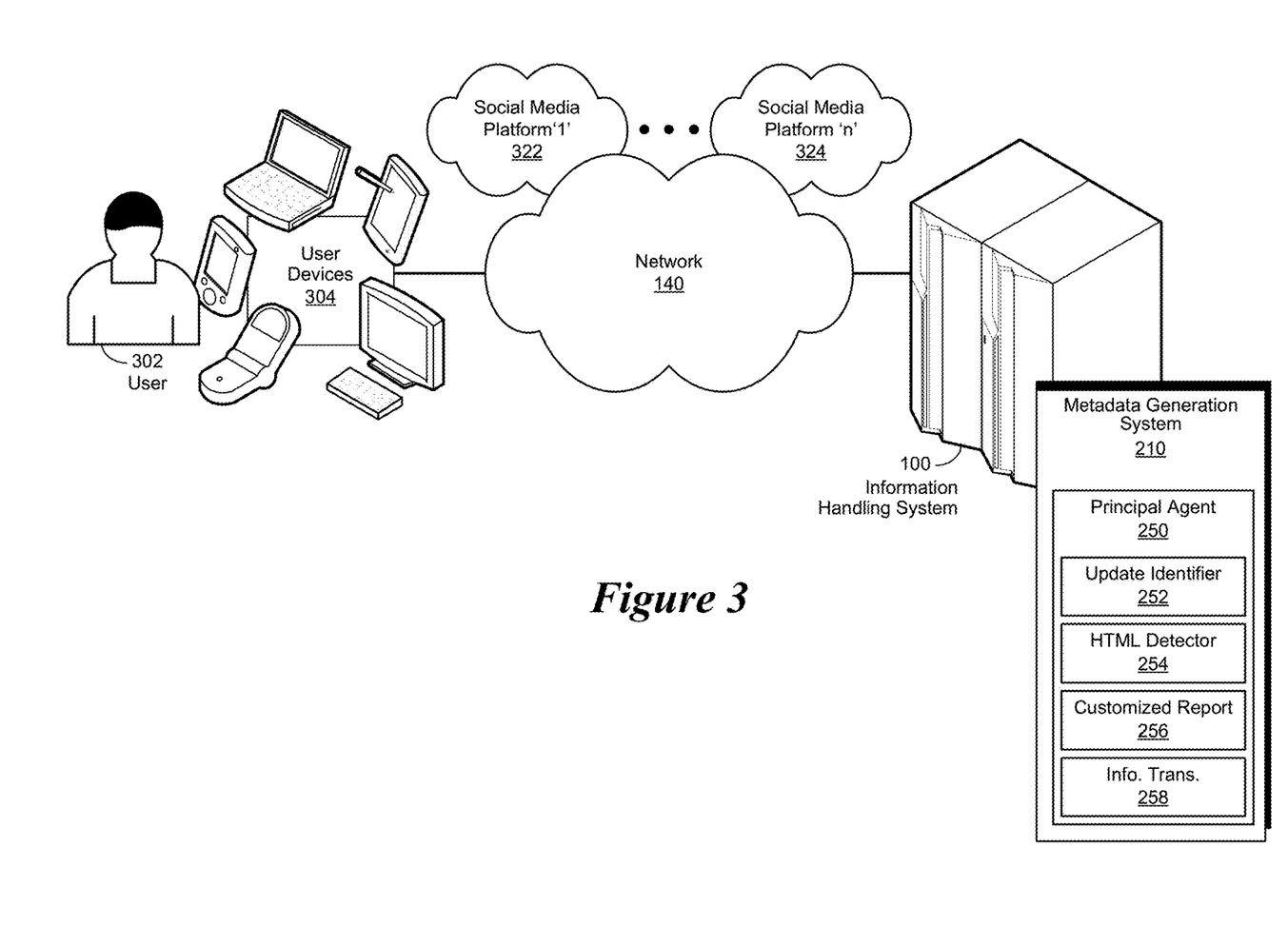
FIG. 3 shows a block diagram of an overview of a short message metadata generation system environment.

FIG. 3 is a simplified block diagram of a metadata generation environment implemented in accordance with an embodiment of the invention. In various embodiments, a user 302 may post information to a social media platform 'a' 322 through 'n' 324, which in turn may become a trending post. In various embodiments, the post information is based upon identified trending information and is identified via a suggested tag identifier. In these and other embodiments, the user 302 may use a user device 304 to post the information to a social media environment 'a' 322 through 'n' 324.

As used herein, a user device 304 refers to an information handling system such as a personal computer, a laptop computer, a tablet computer, a personal digital assistant (PDA), a smart phone, a mobile telephone, or other device that is capable of communicating and processing data. In various embodiments, the user device 304 is used to exchange information between the user 302 and a social media environment 'a' 322 through 'n' 324 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In this embodiment, a metadata generation system 210 is implemented on an information handling system 100 to perform a metadata generation operation to a social media platform 'a' 322 through 'n' 324. In these various embodiments, the network 140 is used by the metadata generation system 210 to monitor the social media platforms '1' 322 through 'n' 324 for tag identification information as well as trending tag identification data.

In various embodiments, the metadata generation system 210 includes some or all of the functionality of the metadata generation module 118. In certain embodiments, the metadata generation system 210 includes a principal agent 250. The chief agent 250 further includes one or more of the update identifier module 252, the HTML detector module 254 the customized report module 256 and the information transmitter module 258.

In various embodiments, the principal agent 250 is associated with and executes on a server type information handling system such as information handling system 100. The server type information handling system may be internal to a particular company or may be associated in some way with a particular company such as by executing on a virtual machine which is remotely located but is controlled by the company. The principal agent 250 communicates with and receives information from a social media platform such as the Twitter social media platform. In certain embodiments, the principal agent 250 accesses the social media platform via a predefined set of application program interfaces (APIs) such as the streaming APIs available from certain social media platforms.

Figure 4:
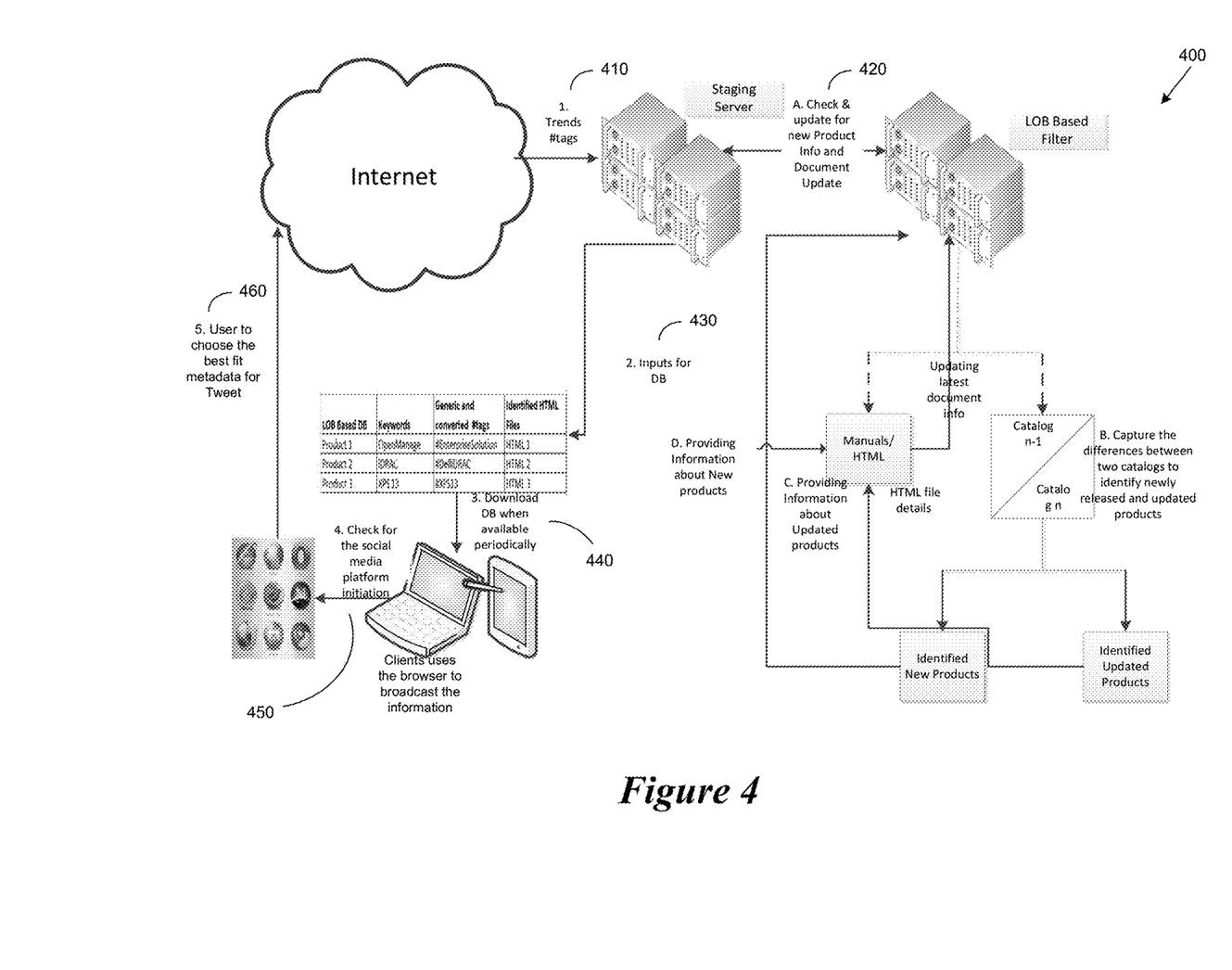
FIG. 4 shows a flow chart of a short message metadata generation operation.

Referring to FIG. 4, a block diagram of a workflow of a short message metadata generation operation 400 is shown. More specifically, the short message metadata generation operation 400 begins at step 410 with the staging server monitoring social media platforms for any trending information (e.g., trending #tags). Next at step 420, the staging server accesses company information to identify new content of interest. The new content of interest may be defined as content associated with a new products as well as content associated with product updates. The process of accessing company information can include applying a filter (such as a line of business or product subcategory based filter) to access a subset of all available company information. When checking for new products as well as product updates the operation can capture a difference between two catalogs to identify newly released or updated products. Additionally, the operation can include obtaining HTML file details from various company documents (such as company manuals) regarding the new or updated products. Next, at step 430, the obtained information is stored to a database. Next at step 440, the information from the database is provided to a user device for use by a user to broadcast information about the new or updated products based upon the metadata stored within the database. Next at step 450, the short message metadata generation operation monitors the user device for any accesses to a social media platform to determine where a social media platform initiation has occurred. If such an access is detected, then at step 460, the short message metadata generation operation automatically provides the user with suggested keywords and tag data to amplify the posting of information about the new or updated products.

Figure 5:
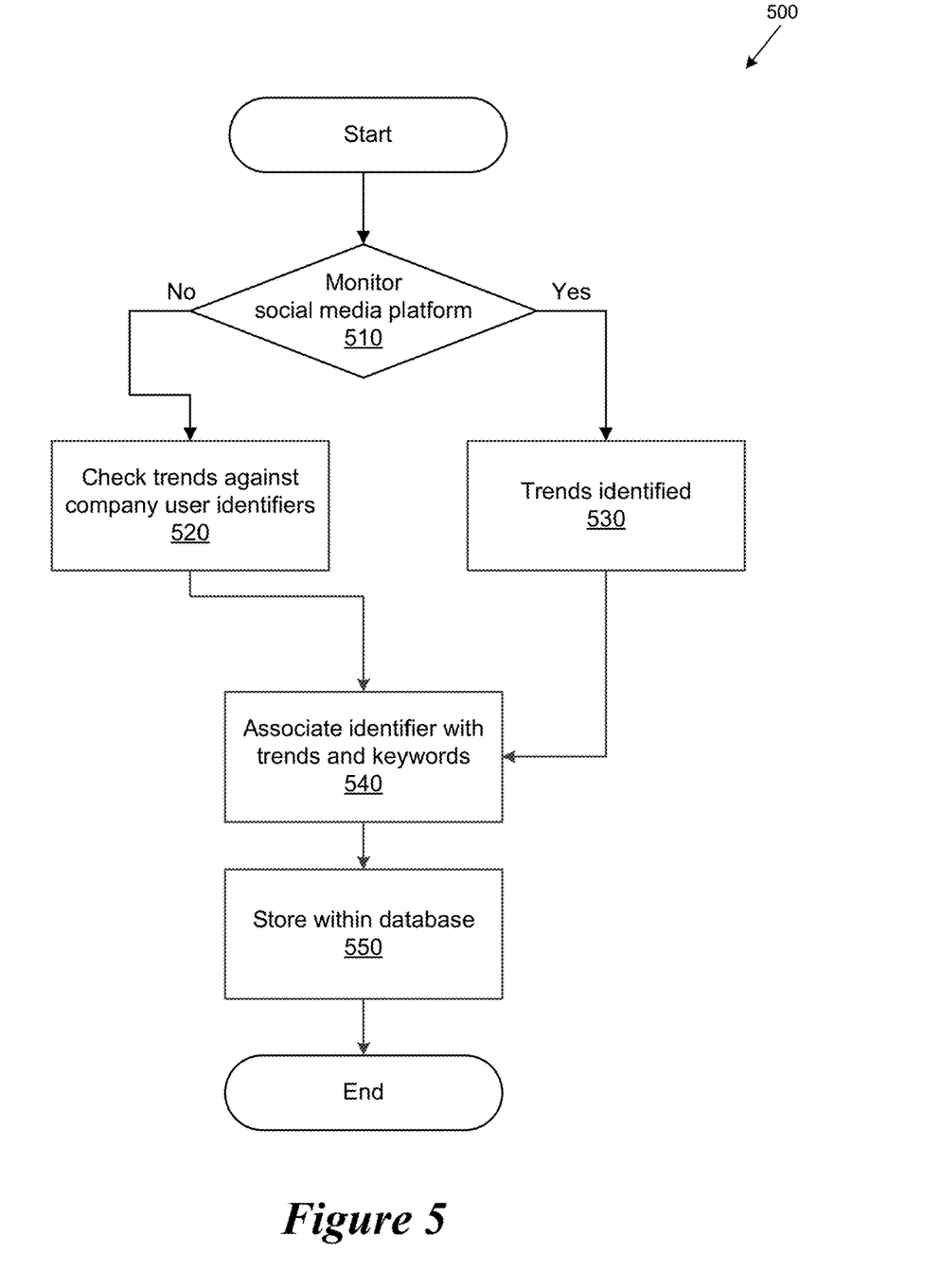
FIG. 5 shows a flow chart of a metadata organization operation.

Referring to FIG. 5, a flow chart of a metadata organization operation 500 is shown. The metadata organization operation 500 uses tag data (such as #tags) and lines of business identification information to update the database.

More specifically, the metadata organization operation 500 starts at step 510 by monitoring a social media platform for general trends and tag data. When certain trends are identified then the operation proceeds to step 520 where the operation checks the trends against a plurality of company user identifiers, for any relevant influencers and analyzes the trends and relevant tags. Additionally, when certain trends are identified then at step 530 the social media platform is monitored for trends and relevant tags relating to areas of interest for the company. Steps 520 and 530 then proceed to step 540 where an identifier such as a line of business identifier is associated with the identified trends and keywords. Next at step 550, the keywords, trends and relevant tag identifiers are associated with each other and are stored within a record of the database.

Figure 6:
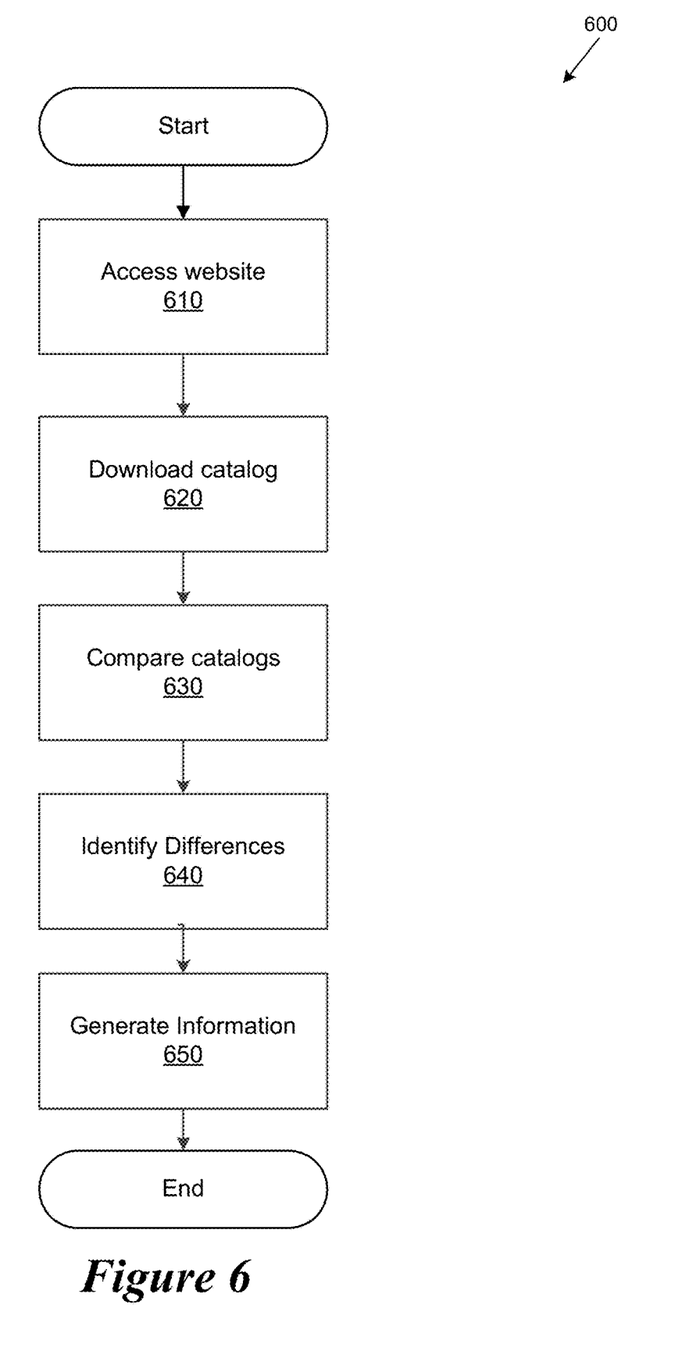
FIG. 6 shows a flow chart of a product information compare operation.

Referring to FIG. 6, a flow chart of a product information compare operation 600 is shown. The product information compare operation 600 access company website to check for any new or updated products. More specifically, the operation begins at step 610 by accessing a main website of the company. Next at step 620, the operation downloads a catalog at a predetermined time (e.g., every data at 9:00 AM). Next at step 630, the operation performs an analysis of a most recent catalog with a next most recent catalog. If there are no differences then the operation returns to step 610. If there are any differences, then at step 640 the catalog is specifically analyzed to identify any values that are different and at step 650 these values are used to generate information regarding any newly released or updated products.

Figure 7:
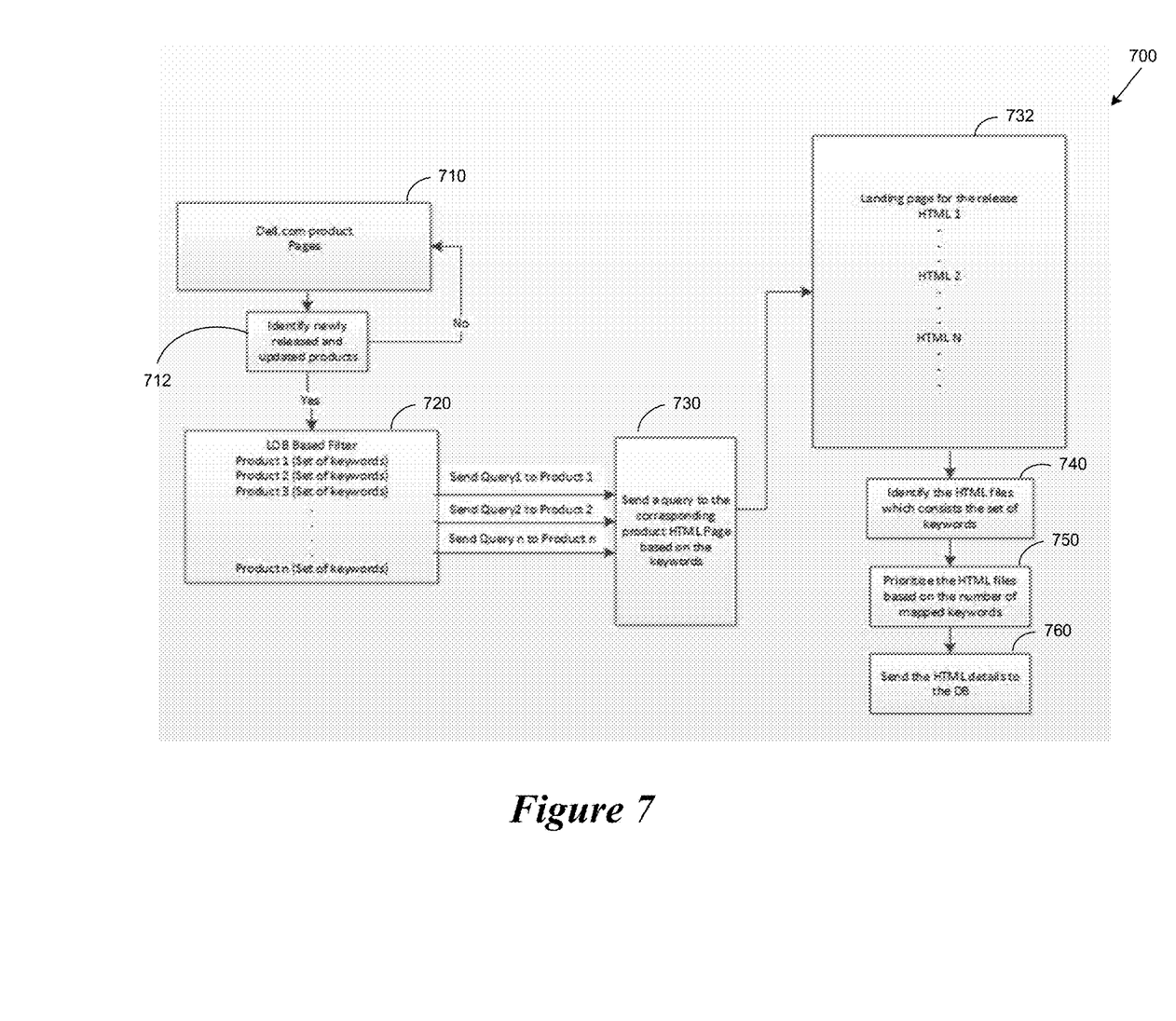
FIG. 7 shows a block diagram of an identification and prioritization of HTML files using keywords.

FIG. 7 shows a block diagram of an identification and prioritization operation 700 of HTML files using keywords. More specifically, the identification and prioritization starts at step 710 by accessing products web pages of a company (e.g., Dell.com product pages) and then identifying new products and update products at step 712. If any new or updated products are identified, then at step 720 filters are applied to the products (such as line of business filters) where each product may have an associated set of keywords. Next queries are generated for each product where the queries are sent to corresponding HTML pages based on the keywords for that product. Next at step 730, the identification and prioritization operation 700 accesses the landing page 732 for each product release to access HTML information (HTML1, HTML2, HTMLN) associated with each of the identified products. Next at step 740, the identification and prioritization operation 700 identifies which HTML files include any of the set of keywords for the identified products. Next, at step 750, based on the number of keywords an HTML file includes, the files are prioritized. Next at step 760 the HTML details (i.e., information contained within each HTML file) are stored to the database for the identified product.

Figure 8:
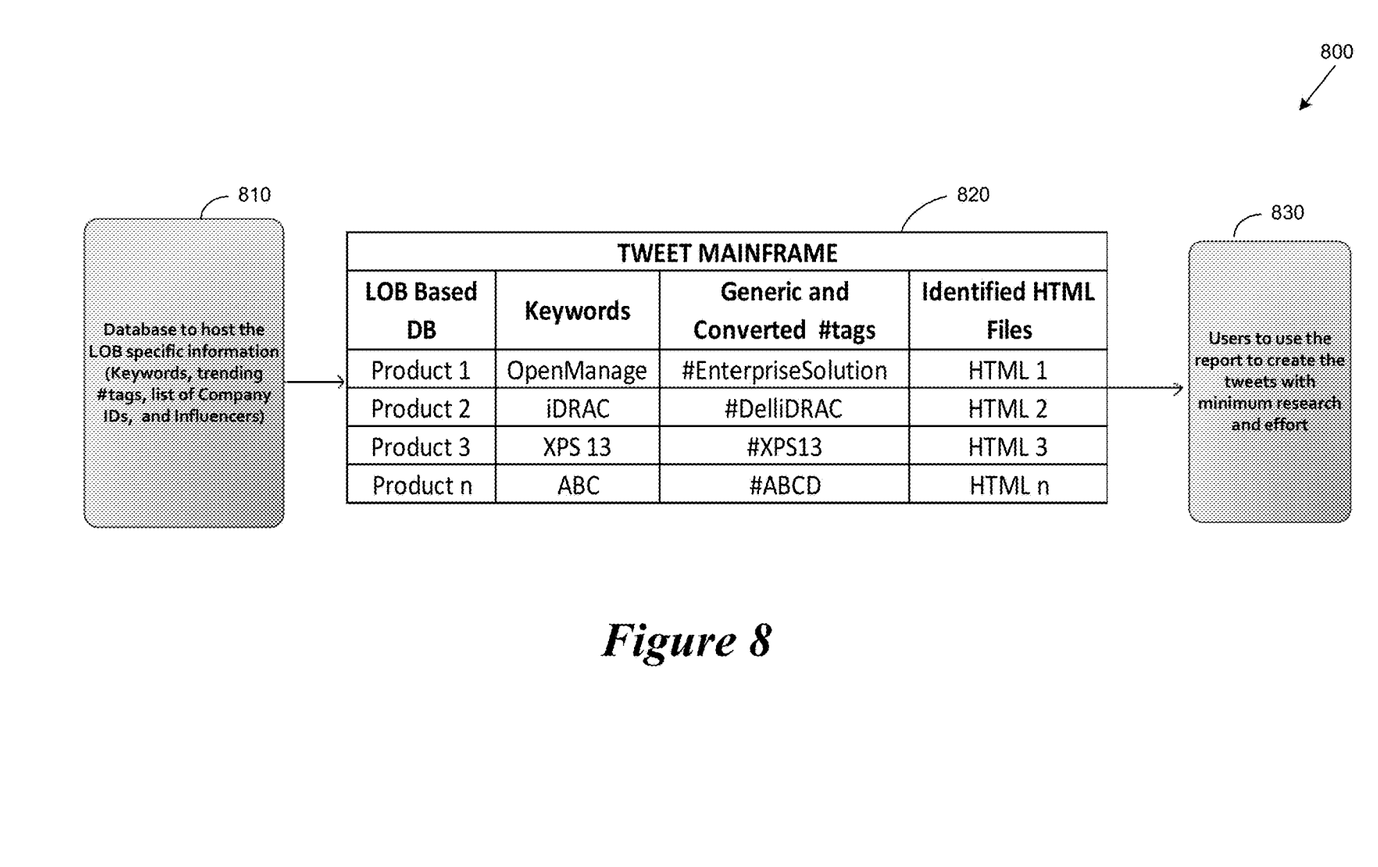
FIG. 8 shows an example an operation for accessing and using a customized report.

FIG. 8 shows an example of an operation 800 of accessing and using a customized report. More specifically, an example customized report 810 includes best fit metadata for a plurality of products of a company. When accessing and using the customized report 810, a database is used to host specific metadata information at step 820. This metadata information includes one or more of keywords associated with a particular product, trending tag data that can be associated with a particular product, a list of company specific identifiers associated with a particular product and a list of influencers associated with a particular product. When accessing and using the customized report 810, a user accesses the report to generate short messages with minimum research and effort at step 830. In certain embodiments, an application executing on a user device can access the report and automatically generate a short message using the information contained within the report.

Figure 9:
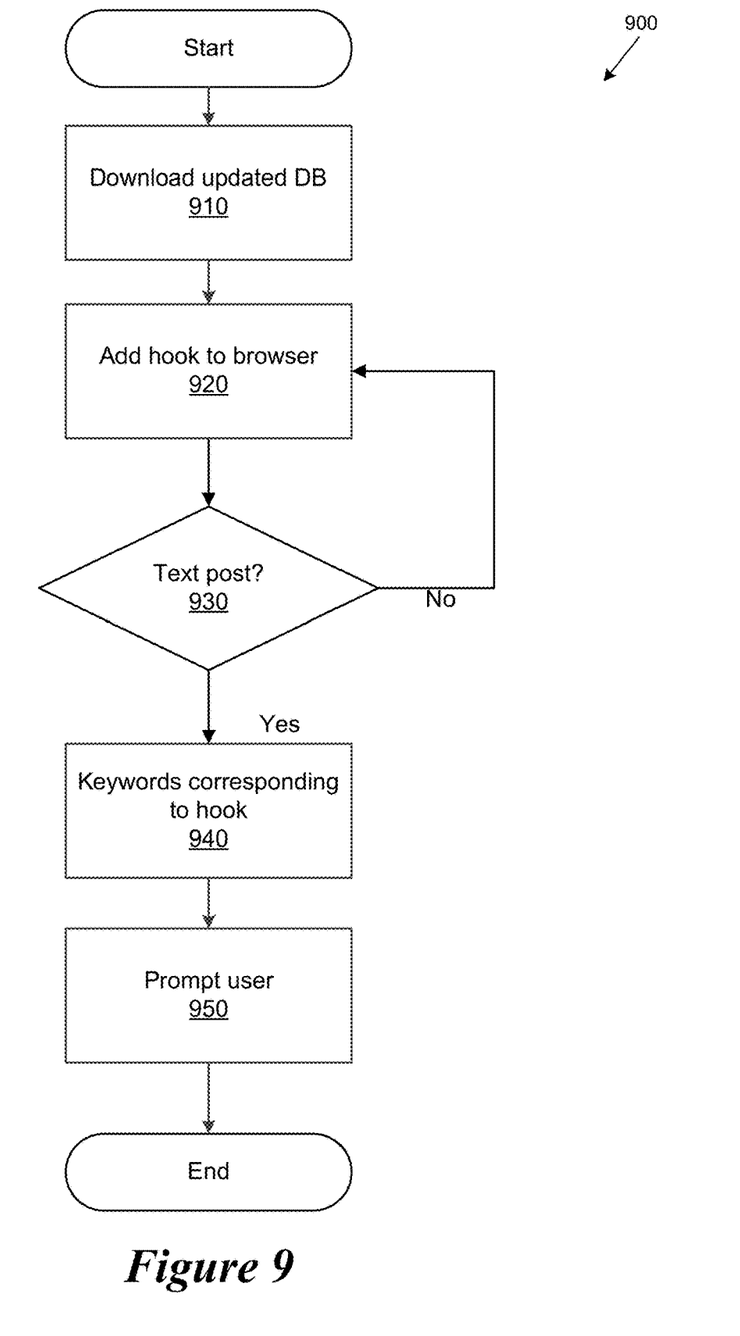
FIG. 9 shows a flow chart of a metadata application operation.

FIG. 9 shows a flow chart of a metadata application operation 900. More specifically, the metadata application operation 800 begins at step 910 by downloading some or all of an updated database to a user device. In various embodiments, the portion of the database that is downloaded to a user device is identified based upon an area for which the user is responsible. Next, at step 920, based upon the contents of the updated database (e.g., the keywords), one or more hooks are associated with a user's browser (and/or a social media platform application) to determine when a text box is actuated. Next at step 930, the system determines with a text post has occurred on a browser or application. This process continues until a text post is detected.

When a text post which corresponds to the hook is detected, then operation 900 proceeds to check for any keywords in the database corresponding to the hook at step 940. The operation then suggests corresponding metadata (e.g., tag data, influencers, HTML files) based upon the keyword. Next at step 950, the operation 900 prompts a user whether the user wishes to accept the suggested metadata.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a short message tag identification operation within a metadata generation environment, the metadata generation environment comprising a metadata generation system executing on a hardware processor of an information handling system, a social media platform and a user device, the metadata generation system, the social media platform and the user device exchanging information via a network, comprising:

accessing company information, the company information comprising HTML file details for company documents;

applying a filter to access a subset of available company information, the filter comprising a line of business filter and a product subcategory based filter;

analyzing the subset of available company information for information regarding content of interest;

monitoring a social media platform for a short message tag identifier, the monitoring being based upon the content of interest, the monitoring determining when a short message tag identifier is trending, the content of interest relating to an area of interest for a company, the area of interest of the company comprising a product associated with the company, the monitoring being performed by a principal agent, the principal agent monitoring inbound and outbound data streams and fetching different metadata from the inbound and outbound data streams, the principal agent comprising an update identifier module, an HTML detector module, a customized report module and an information transmitter module, the update identifier module including intelligence to interact with a product landing page of the company, HTML detector module using predefined keywords to identify HTML files for particular products, the customized report module providing short message metadata to a user and the information transmitter module interact with a browser when initiating a short message post;

storing a trending short message tag identifier when the short message tag identifier is determined to be trending;

identifying metadata information, the metadata information comprising information relating to the product associated with the company;

associating the metadata information with the short message tag identifier;

determining when a user is generating a short message containing content of interest; and, automatically providing the metadata information associated with the short message tag identifier to enable a short message identified by the short message tag identifier to be augmented with the metadata information.

2. The method of claim 1, further comprising:
generating new tag data based upon keywords associated with content of interest.

3. The method of claim 1, further comprising:
capturing trending tag data associated with content of interest.

4. The method of claim 1, further comprising:
identifying influencers associated with content of interest; and,
engaging the influencers via company generated short messages.

5. The method of claim 1, further comprising:
broadcasting the metadata information associated with the short message tag identifier, the metadata information comprising company specific identifiers associated with the short message tag identifier.

6. An information handling system comprising:
a hardware processor;
a data bus coupled to the processor; and
a non-transitory, computer-readable storage medium embodying computer program code for performing a short message tag identification operation within a metadata generation environment, the metadata generation environment comprising a metadata generation system executing on the hardware processor of an information handling system, a social media platform and a user device, the metadata generation system, the social media platform and the user device exchanging information via a network, the non-transitory, computer-readable storage medium being coupled to the data bus, the computer program code interacting with a plurality of computer operations and comprising instructions executable by the processor and configured for:
  accessing company information, the company information comprising HTML file details for company documents;
  applying a filter to access a subset of available company information, the filter comprising a line of business filter and a product subcategory based filter;
  analyzing the subset of available company information for information regarding content of interest;
  monitoring a social media platform for a short message tag identifier, the monitoring being based upon the content of interest, the monitoring determining when a short message tag identifier is trending, the content of interest relating to an area of interest for a company, the area of interest of the company comprising a product associated with the company, the monitoring being performed by a principal agent, the principal agent monitoring inbound and outbound data streams and fetching different metadata from the inbound and outbound data streams, the principal agent comprising an update identifier module, an HTML detector module, a customized report module and an information transmitter module, the update identifier module including intelligence to interact with a product landing page of the company, HTML detector module using predefined keywords to identify HTML files for particular products, the customized report module providing short message metadata to a user and the information transmitter module interact with a browser when initiating a short message post;
  storing a trending short message tag identifier when the short message tag identifier is determined to be trending;
  identifying metadata information, the metadata information comprising information relating to the product associated with the company;
  associating the metadata information with the short message tag identifier;
  determining when a user is generating a short message containing content of interest; and,
  automatically providing the metadata information associated with the short message tag identifier to enable a short message identified by the short message tag identifier to be augmented with the metadata information.

7. The system of claim 6, wherein the instruction executable by the processor are further configured for:
  generating new tag data based upon keywords associated with content of interest.

8. The system of claim 6, wherein the instruction executable by the processor are further configured for:
  capturing trending tag data associated with content of interest.

9. The system of claim 6, wherein the instruction executable by the processor are further configured for:
  identifying influencers associated with content of interest; and,
  engaging the influencers via company generated short messages.

10. The system of claim 6, wherein the instruction executable by the processor are further configured for:
  broadcasting the metadata information associated with the short message tag identifier, the metadata information comprising company specific identifiers associated with the short message tag identifier.

11. A non-transitory, computer-readable storage medium embodying computer program code for performing a short message tag identification operation within a metadata generation environment, the metadata generation environment comprising a metadata generation system executing on a hardware processor of an information handling system, a social media platform and a user device, the metadata generation system, the social media platform and the user device exchanging information via a network, the computer program code comprising computer executable instructions configured for:
  accessing company information, the company information comprising HTML file details for company documents;
  applying a filter to access a subset of available company information, the filter comprising a line of business filter and a product subcategory based filter;
  analyzing the subset of available company information for information regarding content of interest;
  monitoring a social media platform for a short message tag identifier, the monitoring being based upon the content of interest, the monitoring determining when a short message tag identifier is trending, the content of interest relating to an area of interest for a company, the area of interest of the company comprising a product associated with the company, the monitoring being performed by a principal agent, the principal agent monitoring inbound and outbound data streams and fetching different metadata from the inbound and outbound data streams, the principal agent comprising an update identifier module, an HTML detector module, a customized report module and an information transmitter module, the update identifier module including intelligence to interact with a product landing page of the company, HTML detector module using predefined keywords to identify HTML files for particular products, the customized report module providing short message metadata to a user and the information transmitter module interact with a browser when initiating a short message post;
  storing a trending short message tag identifier when the short message tag identifier is determined to be trending;
  identifying metadata information, the metadata information comprising information relating to the product associated with the company;
  associating the metadata information with the short message tag identifier;
  determining when a user is generating a short message containing content of interest; and,
  automatically providing the metadata information associated with the short message tag identifier to enable a short message identified by the short message tag identifier to be augmented with the metadata information.

12. The non-transitory, computer-readable storage medium of claim 11, wherein the computer executable instructions are further configured for:
  generating new tag data based upon keywords associated with content of interest.

13. The non-transitory, computer-readable storage medium of claim 11, wherein the computer executable instructions are further configured for:
  capturing trending tag data associated with content of interest.

14. The non-transitory, computer-readable storage medium of claim 11, wherein the computer executable instructions are further configured for:
  identifying influencers associated with content of interest; and,
  engaging the influencers via company generated short messages.

15. The non-transitory, computer-readable storage medium of claim 11, wherein the computer executable instructions are further configured for:
  broadcasting the metadata information associated with the short message tag identifier, the metadata information comprising company specific identifiers associated with the short message tag identifier.

* * * * *